Jan. 19, 1943.   O. M. BURKHARDT   2,308,858
HYDRO-MECHANICAL CLEARANCE REGULATOR
Filed March 4, 1940   2 Sheets-Sheet 1
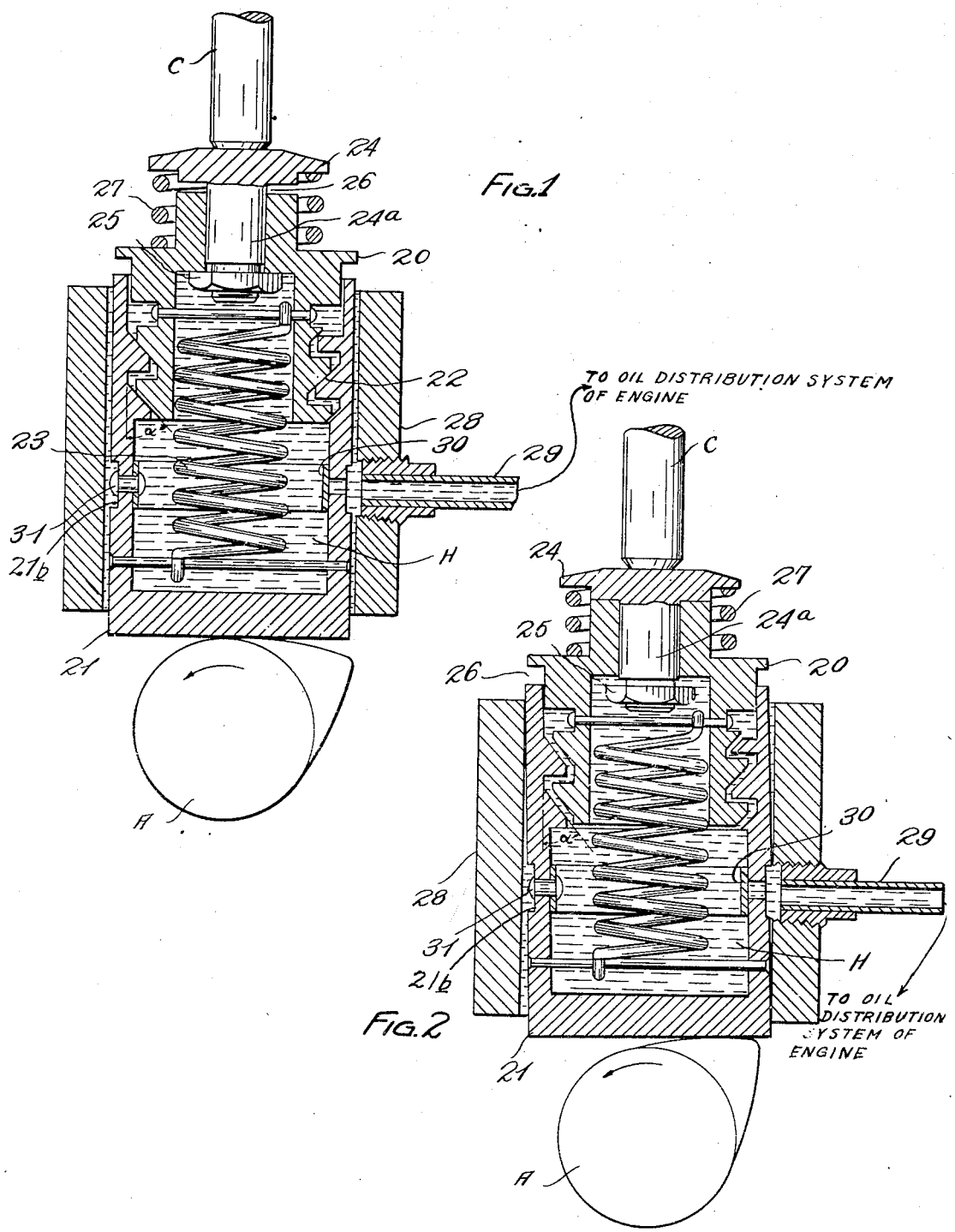
INVENTOR.
OTTO M. BURKHARDT
BY Milburn & Milburn
ATTORNEYS.

Patented Jan. 19, 1943

2,308,858

UNITED STATES PATENT OFFICE 2,308,858

HYDROMECHANICAL CLEARANCE REGULATOR

Otto M. Burkhardt, Cleveland, Ohio, assignor to Thompson Products, Inc., Cleveland, Ohio Application March 4, 1940, Serial No. 322,169

10 Claims. (Cl. 123—90)

This invention relates to the art of valve clearance regulators for use in internal combustion engines and is related to my co-pending applications Serial No. 169,642, filed October 18, 1937, now Patent No. 2,283,536, May 19, 1942, and Serial No. 193,016, filed February 28, 1938, now Patent No. 2,222,138, November 19, 1940.

The functions which a valve clearance regulator has to perform, and the prevailing defects which it has to overcome are fully explained in the said co-pending applications.

As is well known, temperature changes as they are encountered in the operation of an internal combustion engine, produce variations in the length of the various structural units upon which the linkage is mounted and of the valve linkage and hence it is necessary to allow a clearance in the valve linkage. As explained in the said companion applications, objectionable conditions result from this clearance becoming either too little or too great due to temperature changes, and it is the function of an automatic clearance regulator to increase or decrease its own length to compensate for either contraction or expansion of the valve linkage at any given time in order to insure a constant valve timing as well as other advantages. The element of wear also enters into this same consideration, as explained in the above-cited applications.

In the former of the two above-cited applications, the clearance regulator is designed for use in connection with engines in which the cam contour of the cam shaft is provided with a ramp, there being provided a fixed clearance element in this case; while in the latter of the above applications, the regulator is designed for engines in which the cam contour is not provided with a ramp. The present invention is adapted to be employed in connection with either of these two types and with various designs thereof.

The object of the present invention is to introduce in the inventions of the above co-pending applications certain hydraulic features which will insure more positive and more sensitive action and also longer life and thus result in an improvement upon the devices of said co-pending cases through the novel use of well-known hydraulic principles.

For instance, in my co-pending application Serial No. 169,642, it is stated that the clearance between the threads of the regulator members will normally fill with oil. It was pointed out also that the incline of the threads 4 and 5 therein could be made steep enough to permit sliding between the same when only longitudinal force is applied and that by the use of such inclinations, auxiliary means would be required for proper adjustment. In the other case above cited, mention is made of the possible desirability of having a freer flow of oil between the threads of the members.

By the proper use of fluid means, I have evolved a hydromechanical valve clearance regulator with which all three of these formerly enumerated desirable conditions can be obtained, as will appear from the following drawings, description and claims. This constitutes an object of the present invention and it will appear that these advantages are obtained without sacrificing either compactness or simplicity.

In the drawings,

Fig. 1 illustrates the embodiment of hydromechanical type clearance regulator having a fixed clearance element, as utilized in my co-pending application Serial No. 169,642.

Fig. 2 shows the same form of combined hydraulic and mechanical clearance regulator with the fixed clearance of the clearance element taken up by the ramp of the cam contour at the beginning of the operation of the valve linkage.

Figure 3:
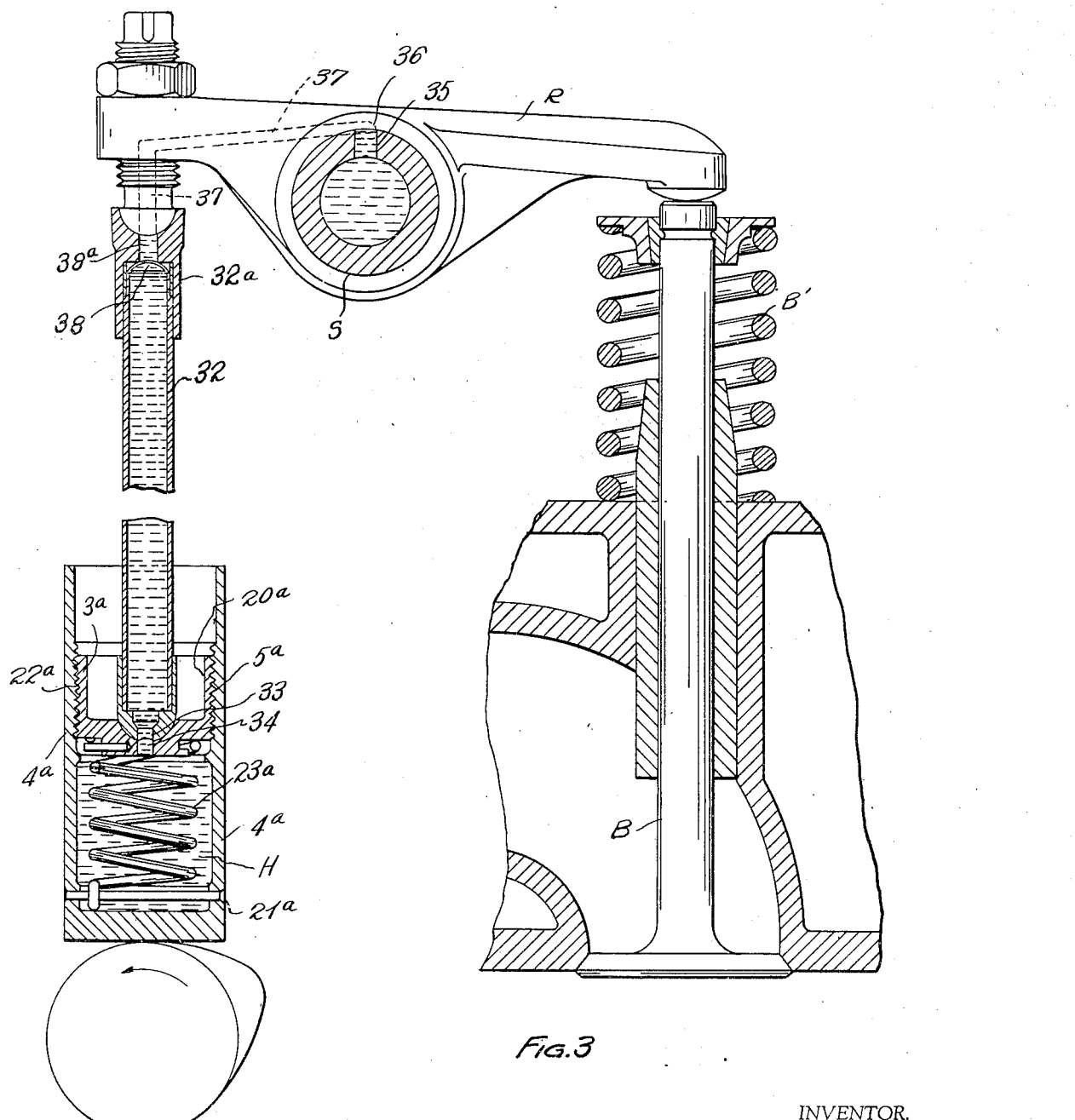
Fig. 3 illustrates another form of hydromechanical clearance regulator in which another application of my present improvement is embodied.

It is to be understood that the present disclosure is merely for the purpose of illustration and that there may be devised various other modifications without departing from the spirit of the present invention as herein set forth and claimed.

Reference will first be had to the form of device illustrated in Figs. 1 and 2 of the accompanying drawings, in which the usual cam shaft is indicated by reference letter A and the push rod by reference C, my clearance regulator being arranged between these parts and comprising the two members 20 and 21 which have inclined surface engagement, as indicated here by the screw-threads 22. These surfaces have two inclinations, the one being identifiable with reference to the helix angle and the other with reference to the angle of the thread form denoted $a$. These members are arranged so as to form a chamber H within the same and within which there are one or more coil springs 23 anchored at their upper and lower ends in any suitable manner. The function of this spring means is to primarily screw the members 20 and 21 apart although it may also serve to exert some axial pressure or tension as the case may require. This same chamber contains also the hydraulic medium to be hereinafter referred to.

In the form of device shown in Figs. 1 and 2, an auxiliary member 24 extends through the upper end of the member 20 and has the nut 25 attached at its lower end. This nut is so adjusted and fixed that there is assured a clearance as indicated by space 26, and has abutment against the end of member 20 and the flange of the auxiliary member 24, as indicated in the drawings.

The outer member 21 of the device has sliding fit within the fixed guide 28 through which there is provided means of communication between the chamber H and the system supplying the hydraulic means, in this case the lubricating system of the engine. The tube 29 from the oil supply system extends through the guide 28 and has communication with the hydraulic chamber through a registering opening in the guide 28 which is controlled by the one-way reed valve 30. This valve is formed from a thin strip of steel which is riveted to the member 21 at the diametrically opposite point 31 while its free end rests against the inner side of the opening through the member 21 so as to permit only entrance of oil into the hydraulic chamber H but does not permit it to flow out of the chamber. The outer surface of member 21 has an annular groove in the zone corresponding to that of the communicating openings, and the tube connection 29 is countersunk, as indicated in Fig. 1 or Fig. 2, so as to ensure constant means of possible communication through the openings referred to during all movements of the member 21.

It is noted that the engine valve is normally held upon its seat by the usual valve spring B' which exerts about fifty (50) pounds pressure. The spring 27 exerts a pressure of about twenty (20) pounds. Spring means 23 tends normally to screw the member 20 and 21 apart with a torque which causes them to exert an axial pressure of about ten (10) pounds upon their confining members, namely, the cam shaft and the valve stem or push rod C or some other such member interposed in the valve linkage. These ten (10) pounds subtract themselves from the twenty (20) pounds exerted by spring 27 to insure clearance.

It will be understood that for that part of the cam shaft motion during which only the base circle of the cam is in contact with the lower face of member 20, the valve has been held firmly upon its seat by the regular valve spring. It is to be understood also that any imperfections in the form of protuberances upon the base circle will be compensated for by the fixed clearance 26 without disturbing the seated condition of the valve. Also, after the engine has been idle and temperature changes have caused changes in the length of all structural members and the valve linkage without the clearance regulator compensating for them, and the engine is then started, this fixed clearance 26 is available to make up any possible deficiency brought about while the engine was idle and the clearance regulator was inoperative.

As the cam shaft progresses from the position of Fig. 1 to the position indicated in Fig. 2, the plunger part 24a of member 24 will be caused by the ramp on the cam flank or the cam flank proper to penetrate into the hydraulic chamber and will cause very high hydraulic pressure within this chamber. If we assume that the outside diameter of the thread of member 20 has ten times as great an area as that of plunger part 24a, then members 20 and 21 will be forced axially apart by the hydraulic pressure within the fluid a distance one-tenth of that which plunger part 24a penetrates the hydraulic chamber H, that is to say one-tenth of the fixed clearance 26. While the plunger penetrates into the full fluid chamber H, it is obvious that the high fluid pressure so created will separate the members 20 and 21 following the same hydraulic laws which govern the operation of a hydraulic press. If the clearance 26 is .010 of an inch, it follows that the members 20 and 21 will be separated about .001 of an inch. Since this separation of members 20 and 21 is caused by hydraulic pressure, it is obvious that all metallic contact between these members will disappear and a fluid film will exist where metallic contact existed before. Thus, I have devised a hydraulic means for transmitting impulses from the drive member to the members 20 and 21 for effecting required adjustment therebetween.

Fig. 2 illustrates the condition when the plunger part 24 has penetrated into the hydraulic chamber H its maximum distance and the head of the plunger 24a engages the adjacent upper end of the member 20. Then member 20 is actually floating within member 21 and whatever pressure exists between these members is carried by the fluid. Thus, we have momentarily a strictly hydraulic tappet. This period corresponds to the initial angular movement of the cam shaft A up to the point of taking up the clearance 26.

As the rotation of the cam shaft A continues, the motion of the valve linkage is being accelerated. This causes a pressure identical to that referred to in my co-pending application Ser. No. 193,016 as force V, and its reaction V' which is exerted downwardly in a direction corresponding to the longitudinal axis of the members 20 and 21. The forces V and V' constitute a force couple which causes the member 21 to tilt slightly within its guide 28, while the momentarily floating members 20 and 24 remain substantially in axial alignment with the linkage. The temporary floating condition of member 20 within member 21 easily permits of a slight axial misalignment of the latter member induced by the eccentric force V while member 20, due to the concentric force V', remains in substantial axial alignment. This condition of slight displacement of one member relative to the other greatly facilitates a sensitive and positive operation of the clearance regulator.

While the cam shaft continues its angular motion, the eccentric forces referred to will also continue and the pressure V, which is substantial, causes the oil film between the inclined surfaces of the members 20 and 21 to diminish; and when this takes place, some of the oil which was originally forced by the plunger part 24a into the space between the inclined surfaces, is now forced out through the clearance between the cylindrical surfaces of members 20 and 21 to return to the oil supply system within the engine. During the very short time while part 20 is virtually floating within the member 21, the friction between the load bearing surfaces is very small, but as the pressure V continues until the valve is accelerated to maximum velocity, it is obvious that members 20 and 21 will screw together a small amount until, the friction between the inclined surfaces becoming greater as the fluid film becomes thinner, the members 20 and 21 are frictionally held together. The contact surfaces of members 20 and 21 are chosen to be self-locking. Due to the fact that the helix angle of the threaded surfaces is small, a relative axial motion between members 20 and 21 of .001 of an inch is accompanied by a relative angular motion of about .020 of an inch between members 20 and 21. The angle $\alpha$ of the thread form acts as a wedge in stopping motion between the inclined surfaces.

During the closing of the valve, the pressure V between the cam lobe and the lower end of the member 21 having passed the vertical center line, acts now upon the opposite side thereof. Consequently, the force couple VV' reverses and the slightly misaligned axes of the members 20 and 21 will tend to misalign themselves in the opposite direction, and this will cause a slight relative motion between the contact surfaces of the threaded portions which, under the influence of the pressure V, will cause a further very slight screwing together of the members 20 and 21.

It should be noted that when due to the pressure V, the fluid film between the load carrying surfaces is squeezed out, then the present clearance regulator must be recognized as acting like a strictly mechanical device or identically the same as the regulators disclosed in my co-pending application Serial No. 193,016.

It might be stated also that the hydraulic chamber H is enclosed within the space which is virtually sealed by the check valve, by the plunger 24ª, and by the threads of members 20 and 21. While there might be a little leak in all of these regions, any such leakage would be through very small clearances, and hence very slow. Members 20 and 21 can therefore screw together only by that very small amount which has been made available by the fluid which has leaked out. This will permit the inclined surface contact to be made a little steeper than otherwise, thereby rendering the members more sensitive and more positive in their adjustment. The slight leakage referred to will also permit the escape of air from the chamber within the members 20 and 21.

For proper functioning it is preferable that the fluid within the hydraulic chamber H be under pressure, as for instance would be the case when connected with the oil distribution system of the engine, as herein referred to. In such case, the pressure will tend to separate members 20 and 21 axially as much as the clearance between the threaded surfaces will permit, even when the member 21 engages the base circle of the cam shaft A. Then the upper surfaces of the threads will take the pressure and all of the clearance will develop between the lower threaded surfaces, and this clearance will of course fill with the fluid from the hydraulic chamber H. But when there is exerted the pressure V upon the member 21, as above explained, the lower surfaces of the threads will come to carry the pressure since the pressure V is greater than that of the fluid within the chamber H.

To explain more fully another feature briefly mentioned above, it should be noted that the valve linkage is normally not fully constrained in its operation and consequently a valve at high speed will deviate from its geometrical course. This is the case at high speed when fifteen (15) degrees of the cam shaft motion takes place in about .001 of a second. When the valve B deviates from its geometrical course, it happens that momentarily a clearance develops within the linkage. In some automatic adjusters, it so happens by accident that this momentary clearance is at once taken up by the automatic adjuster. But it should be noted that such adjusters then lengthen while the valve is being opened whereas it is very important that during this period the length of the clearance adjuster should decrease. As a result, some automatic adjusters keep valves from closing at high speed. In the case of the present invention members 20 and 21, which normally screw together during the valve lift, would have to reverse and screw apart when such momentary clearance occurs during the valve lift in order for the valve linkage to lengthen. But the time during which this momentary clearance lasts, perhaps .001 second, is far too short for spring 23 to screw members 20 and 21 apart although this spring will tend to screw these members apart while the bottom surface of member 21 is in contact with the base circle. The reason for this is that the time during which member 21 is in contact with the base circle of the cam A is at least 10 to 15 times as long as the period of the momentary clearance during the opening of the valve. Therefore the clearance regulator does not adjust slackness which momentarily exists at high speeds in the valve linkage during the valve lift, but only such slackness as is due to wear and contraction. The result is that the operation of my regulator is better timed with respect to the operation of the other parts of the engine and there is obtained an increased efficiency.

Fig. 3 illustrates another form of my hydromechanical clearance regulator for such cases where no constant clearance element is needed. More particularly this form of clearance regulator is here used in connection with a conventional valve linkage where a rocker arm and a push rod are employed. The members 20ª and 21ª have inclined surface engagement with each other, as indicated by the screw threads 22ª which extend throughout only approximately the middle portion of the member 21ª. Members 20ª and 21ª are so constructed and arranged as to provide a hydraulic chamber H between the same and within this chamber there is arranged the coil spring means 23ª anchored at the upper end in any suitable manner to member 20ª and at the lower end to member 21ª as indicated in the drawing. The screw threads 22ª are of substantially the same form as in the other species of invention herein disclosed and the function of the spring means 23ª is also the same as in the other case. The cam shaft A is adapted to run in the direction indicated by the arrow. The valve stem is indicated by reference letter B and the valve spring by reference letter B'.

In Fig. 3 the clearance regulator is arranged between the cam shaft and the lower end of the hollow push rod 32, which fits in a corresponding socket in the member 20ª. The hydraulic chamber H and also the hollow push rod 32 are filled with a suitable liquid, preferably oil, and these chambers have communication with each other through the registering orifices in the lower end of the push rod and the corresponding contact surface of the member 20ª, these orifices being indicated by reference numerals 33 and 34, respectively.

As is common practice, the rocker arm R is mounted upon a hollow shaft S through which there is supplied oil from the engine lubricating system. It will be observed that the opening 35 permits passage of the oil into the overlapping end of the passage 36 in the rocker arm R, which is provided also with suitable communicating passage 37 for directing the oil to the upper end of the push rod 32. Thence the oil may flow through an orifice 38ᵃ in the upper end 32ᵃ into the hollow push rod 32. At this point there is provided a check valve 38.

When the cam A accelerates the valve linkage in the direction for opening the engine valve, the inertia of the check valve 38 tends to open the passage past the same, and the inertia of the oil at the upper convex side of the check valve causes it to flow past the same into the hollow push rod 32 and thence into the hydraulic chamber H. From the chamber H a small part of the oil leaks out past the screw threaded surfaces 22ᵃ.

The function and operation of the oil or other fluid within the form of device illustrated in Fig. 3 is similar in principle to that above explained in connection with Figs. 1 and 2. The action of the specific embodiment shown in Fig. 3 will now be more fully explained.

Let A denote the area of the orifice 34 and let us assume that the area of the member 20ᵃ, which is influenced by the fluid pressure, is 150A which is within the scope of my present design. Then if the fluid pressure due to the weight of the fluid column acting upon the lower surface of member 20ᵃ is P, the pressure tending to lift member 20ᵃ will be 150AP. Now it is conceivable to design that part of the valve linkage which rests upon and including member 20ᵃ so that its weight will be approximately equal to 150AP or 150 times the weight of a fluid column represented by AP. Then, in such case, when the valve linkage is actuated by cam A both the fluid column and the linkage resting upon and including member 20ᵃ, will be accelerated identical amounts, presupposing a rocker arm ratio of 1 to 1. Under such conditions, it follows that the inertia pressure of the fluid column balances at all speeds the inertia pressure of the valve linkage, and the threaded connection between the members 20ᵃ and 21ᵃ has very little load to carry, namely, only that due to the valve spring and friction.

However, the designer may make the rocker arm ratio anything he wishes, realizing that some inertia of the valve linkage can be carried successfully by the threads between members 20ᵃ and 21ᵃ, or also a higher pressure may be exerted upon the fluid than that due to inertia of the valve linkage. It must be realized that the inertia pressure exists only as long as the acceleration lasts. When the entire linkage has been accelerated up to maximum velocity, then retardation occurs and the fluid pressure as well as the inertia pressure reverse. The fluid will then tend to flow from chamber H through the push rod and the various orifices backward into rocker arm shaft S. Inasmuch as there is a difference between the area of member 20ᵃ and that of the orifices of about 150 to 1, it follows that a fluid column .001 high in space H corresponds to a fluid column .150 high within the orifices. Therefore, when the inertia reverses and the fluid begins to flow toward the rocker arm shaft, we have for .001 evacuation of fluid from chamber H a flow of .150 past the check valve 38. However, the check valve is so arranged that the least backward flow of fluid closes it. In fact the check valve could very well be so arranged that it closes under the influence of a spring, in which case no reversal of flow could take place. Therefore it will be realized that member 20ᵃ can screw into the hydraulic chamber H only to the very limited extent corresponding roughly to the space vacated by the fluid escaping out between the screw threads 22ᵃ, and, inasmuch as the fluid in the hydraulic chamber H is under pressure only while the valve linkage is being accelerated but not while the linkage is being retarded, the leakage past the screw threads 5ᵃ is consequently very small, and likewise the adjustment is correspondingly small for a single impulse but sufficient in the aggregate to function in the manner intended.

While the present tappet operates to a large extent on hydraulic principles, it also functions through threaded surfaces and in this respect is to be regarded as being entirely analogous to the strictly mechanical tappets disclosed in my companion application Serial No. 193,016 above referred to. In fact, the form of invention herein disclosed embodies the same reliable mechanical features which characterize the co-pending applications. Some automatic valve adjusters are known where the proper functioning depends entirely on hydraulic cushioning. Such valve adjusters have some disadvantages which are overcome when hydraulic means constitute only an auxiliary means, as is the case in the present application.

In referring to the forms of device illustrated in Figs. 1, 2, and 3 as being "hydro-mechanical," it is intended to convey the thought that they are of both a mechanical and a hydraulic nature, this term being here employed as a matter of convenience and with this understanding. As above explained, the specific forms of device shown in Figs. 1, 2, and 3 are primarily of a mechanical nature and embody an auxiliary hydraulic means, and the term "hydro-mechanical," as herein employed, is to be understood as not being incompatible with this thought.

To recapitulate briefly, all of the several objects as above stated are accomplished by my present invention in its several forms, as herein illustrated, with the resultant advantages, as above noted. For instance, my present invention will give constant timing in the valve operation, it will ensure firm closing of the valve and will avoid the danger of incompletely closing of the valve, and will operate in a quiet, positive and dependable manner. Also, it can be manufactured at comparatively low cost.

What I claim is:

1. An automatically adjustable clearance regulator adapted for assembly in the valve linkage of an internal combustion engine, with its longitudinal axis corresponding with the length of the valve linkage and comprising companion inter-engaging members capable of relative longitudinal adjustment in either direction for either taking up or providing clearance, and hydro-mechanical means arranged between said members for effecting such adjustment including co-operating surfaces on said members inclined with respect to the direction of linkage operation and said members having a chamber therebetween for a hydraulic body therewithin, said chamber being substantially closed against the entrance of air into the body of said hydraulic fluid, and means normally tending to force said companion members towards distended position, said hydraulic body serving to transmit impulses from the driving member of the valve linkage to said companion members, whereby said hydro-mechanical means is actuatable automatically by the actuation of the valve linkage for effecting adjustment between said members in accordance with the length of the valve linkage at any given time.

2. An automatically adjustable clearance regulator adapted for assembly in the valve linkage of an internal combustion engine, with its longitudinal axis corresponding with the length of the valve linkage and comprising companion interengaging members capable of relative longitudinal adjustment in either direction for either taking up or providing clearance, and hydromechanical means between said members including co-operating self-locking surfaces on said members inclined with respect to the direction of the linkage operation and means for applying hydraulic pressure between said members sufficient to prevent formation of bubbles in the hydraulic body, and means tending normally to force said companion members towards distended position, said hydraulic pressure means serving to transmit impulses from the drive member of the valve linkage to said companion members, whereby said hydro-mechanical means is actuatable automatically by the actuation of the valve linkage for effecting adjustment between said members in accordance with the length of the valve linkage at any given time and for holding said members in position to which thus adjusted.

3. An automatically adjustable clearance regulator adapted for assembly in the valve linkage of an internal combustion engine, with its longitudinal axis corresponding with the length of the valve linkage and comprising companion interengaging members capable of relative longitudinal adjustment in either direction for either taking up or providing clearance, and hydro-mechanical means between said members including co-operating surfaces on said members inclined with respect to the direction of linkage operation and said members having a substantially closed hydraulic chamber therebetween embracing said inclined surfaces so as to have communication with the same, a hydraulic fluid within said chamber, said chamber being substantially closed against the entrance of air into the body of said hydraulic fluid, and means tending normally to force said members towards distended position, the hydraulic body within said chamber serving to transmit impulses from the drive member of the valve linkage to said companion members, whereby said combined means is actuatable automatically by the actuation of the valve linkage for effecting adjustment between said members in accordance with the length of the valve linkage at any time.

4. An automatically adjustable clearance regulator adapted for assembly in the valve linkage of an internal combustion engine, comprising companion members capable of relative longitudinal adjustment in either direction for either taking up or providing clearance, and hydro-mechanical means including co-operating surfaces on said members inclined with respect to the direction of the linkage operation, said members having a hydraulic chamber therebetween and a hydraulic body within said chamber, said chamber being substantially closed against the entrance of air into the body of said hydraulic fluid, a torque spring arranged within said chamber for normally tending to extend said members, said hydraulic body serving to transmit impulses from the drive member of the valve linkage to said companion members, whereby said means is actuable automatically by the actuation of the valve linkage for effecting adjustment between said members in accordance with the length of the valve linkage at any time.

5. In an internal combustion engine in which the operation of the valve linkage is attended by eccentric forces between the driving and driven members, an automatically adjustable hydromechanical clearance regulator adapted for assembly longitudinally between the driving and driven members, including companion members of hollow form and arranged longitudinally and having self-locking screw-threaded inter-engagement throughout a limited longitudinal section thereof and having sufficient clearance between said threads and elsewhere and being responsive to the said eccentric forces for angular adjustment of the longitudinal axis of the one member with respect to the other member, means tending normally to force said companion members towards distended position, said members having a hydraulic pressure chamber therebetween and therewithin in communication with said screw-threaded area, and a hydraulic fluid in said chamber serving to transmit impulses from the drive member to said companion members, whereby said regulator is actuated automatically for effecting and holding the necessary adjustment between said companion members.

6. An automatically adjustable clearance regulator adapted for assembly in the valve linkage of an internal combustion engine, with its longitudinal axis corresponding with the length of the valve linkage and comprising companion inner and outer hollow intercommunicating members having self-locking screw-thread engagement with each other and adapted for longitudinal relative adjustment, said members having a substantially closed hydraulic chamber therewithin and therebetween in communication with the space between said screw threads, a coil spring arranged within said chamber and between said members for normally tending to force said members towards extended position, a hydraulic fluid within said chamber and being adapted to fill the space between said screw threads, and means extending longitudinally through one of said members and into said chamber and having fixed clearance longitudinally with respect to said one member and being of substantially smaller diameter than the inner one of said members, said fixed clearance means being arranged longitudinally in the valve linkage and being adapted to transmit outside linkage pressure to said hydraulic body within said chamber and thence to said companion members for effecting and holding the necessary adjustment thereof.

7. An automatically adjustable clearance regulator adapted for assembly in the valve linkage of an internal combustion engine, with its longitudinal axis corresponding with the length of the valve linkage and comprising companion inner and outer hollow intercommunicating members capable of relative longitudinal adjustment in either direction for either taking up or providing clearance, and hydro-mechanical means including co-operating surfaces on said members inclined with respect to the direction of linkage operation, means normally tending to force said members towards extended position, said members having a hydraulic pressure chamber therebetween, a body of oil in said chamber, and one-way means of communication between said chamber and the oil pressure system of the engine so as to supply oil to said chamber, the oil in said chamber serving to transmit impulses from the drive member of said valve linkage to said companion members, whereby said hydro-mechanical means is actuatable automatically by the actuation of the valve linkage for effecting adjustment between said members in accordance with the length of the valve linkage at any given time.

8. An automatically adjustable clearance regulator adapted for assembly in the valve linkage between the cam shaft and hollow-shaft rocker arm of an internal combustion engine, with its longitudinal axis corresponding with the length of the valve linkage and comprising a hollow push rod, longitudinally adjustable hollow companion members, hydro-mechanical means including a self-locking screw-threaded engagement between said members adapted for longitudinal relative adjustment, and said members having a substantially closed hydraulic chamber therebetween in communication with said hollow push rod through a restricted opening and with said screw-threaded area, a torque coil spring arranged within said chamber and between said companion members for normally tending to force said members towards extended position, means of hydraulic communication from said rocker arm through said push rod to said chamber and said screw-threaded area, said hydraulic means serving to transmit impulses from the drive member of the valve linkage to said companion members, whereby said companion members are automatically adjusted and held in adjusted position in accordance with the length of the valve linkage at any given time.

9. An automatically adjustable clearance regulator adapted for assembly in the valve linkage of an internal combustion engine, comprising companion members capable of relative longitudinal adjustment in either direction for either taking up or providing clearance, means tending normally to force said members to extended position, and hydro-mechanical means including inclined surfaces on said members inclined with respect to the direction of the linkage operation and including also hydraulic means, under sufficient pressure to prevent the formation of bubbles in the hydraulic body, effective between said members for transmitting an impulse from the drive member of the valve linkage to said members for effecting adjustment therebetween longitudinally of the valve linkage, whereby said means is actuatable automatically by the actuation of the valve linkage for effecting adjustment between said members in accordance with the length of the valve linkage at any given time.

10. An automatically adjustable clearance regulator adapted for assembly in the valve linkage of an internal combustion engine, comprising companion members capable of relative adjustment longitudinally of the valve linkage for either taking up or providing clearance, spring means normally tending to force said members to extended position, and hydro-mechanical means including co-operating surfaces on said members inclined with respect to the direction of the linkage operation and including also hydraulic means, under sufficient pressure to prevent the formation of bubbles in the hydraulic body, effective between said companion members for transmitting impulses from the drive member of the valve linkage to said companion members for effecting relative longitudinal adjustment therebetween, whereby said means is actuatable automatically by the actuation of the valve linkage for effecting adjustment between said members in accordance with the length of the valve linkage at any given time.

OTTO M. BURKHARDT.